United States Patent
Verswyvel et al.

(10) Patent No.: US 11,879,059 B2
(45) Date of Patent: Jan. 23, 2024

(54) INTRINSICALLY NON-BLOCKING SHRINK SLEEVE MATERIAL

(71) Applicant: INEOS STYROLUTION GROUP GMBH, Frankfurt am Main (DE)

(72) Inventors: Michiel Verswyvel, Mechelen (BE); Norbert Niessner, Friedelsheim (DE); Daniel Wagner, Bad Duerkheim (DE); Michael Schuster, Erpolzheim (DE); Geert Verlinden, Stekene (BE); Bart Van-Den-Bossche, Bornem (BE); Konrad Knoll, Mannheim (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 1190 days.

(21) Appl. No.: 16/487,211

(22) PCT Filed: Feb. 19, 2018

(86) PCT No.: PCT/EP2018/054004
§ 371 (c)(1),
(2) Date: Aug. 20, 2019

(87) PCT Pub. No.: WO2018/153808
PCT Pub. Date: Aug. 30, 2018

(65) Prior Publication Data
US 2023/0140291 A1    May 4, 2023

(30) Foreign Application Priority Data
Feb. 21, 2017 (EP) .................................... 17157206

(51) Int. Cl.
C08L 53/02 (2006.01)
C08J 5/18 (2006.01)

(52) U.S. Cl.
CPC ............... C08L 53/02 (2013.01); C08J 5/18 (2013.01); *C08J 2353/02* (2013.01); *C08J 2453/02* (2013.01); *C08L 2203/162* (2013.01); *C08L 2205/025* (2013.01); *C08L 2205/03* (2013.01); *C08L 2205/06* (2013.01)

(58) Field of Classification Search
CPC .. C08J 2353/02; C08L 53/02; C08L 2205/025
See application file for complete search history.

(56) References Cited

U.S. PATENT DOCUMENTS

| | | |
|---|---|---|
| 3,639,517 A | 2/1972 | Kitchen et al. |
| 4,091,053 A | 5/1978 | Kitchen |
| 5,972,519 A | 10/1999 | Niessner et al. |
| 6,521,712 B1 | 2/2003 | Knoll et al. |
| 6,593,430 B1 | 7/2003 | Knoll et al. |
| 2005/0009990 A1 | 1/2005 | Knoll et al. |
| 2011/0098401 A1 | 4/2011 | Muller et al. |
| 2012/0061287 A1 | 3/2012 | Knoll et al. |
| 2017/0240740 A1* | 8/2017 | Hamilton .................. C08J 5/18 |

FOREIGN PATENT DOCUMENTS

| | | |
|---|---|---|
| DE | 10306891 A1 | 8/2004 |
| JP | H09235443 A | 9/1997 |
| JP | 2012116875 A | 6/2012 |
| WO | 2016/034609 A1 | 3/2016 |

OTHER PUBLICATIONS

International Preliminary Report on Patentability in International Application No. PCT/EP2018/054004, dated Feb. 1, 2019.

* cited by examiner

*Primary Examiner* — Jeffrey C Mullis
(74) *Attorney, Agent, or Firm* — RAPHAEL BELLUM PLLC

(57) ABSTRACT

Polymer compositions comprising stiff and tough star shaped styrene butadiene block-copolymers A1 and A2 can be used for making shrink films. Block copolymer A2 preferably has the structure

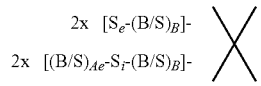

with hard blocks $S_e$ and $S_f$, hard random copolymer blocks $(B/S)_{Ae}$, soft random copolymer blocks $(B/S)_B$ coupled by a coupling agent X.

17 Claims, 4 Drawing Sheets

100.000 :1          200 nm 100.000 : 1          200 nm 200 nm 200 nm

INTRINSICALLY NON-BLOCKING SHRINK SLEEVE MATERIAL

The invention relates to polymer compositions comprising styrene butadiene block-copolymers (SBC) for shrink films, a SBC block copolymer that can be used for said polymer composition, and the use of said polymer compositions for the production of shrink films and of multilayer films.

Stiff and tough SBC polymers and polymer compositions are known. The U.S. Pat. Nos. 3,639,517 and 4,091,053 disclose radial block copolymers of the structure $(A-B)_{\geq 3}Y$ comprising non-elastomeric polymer blocks A, made from vinylaromatic monomers, and elastomeric polymer blocks, made from dienes B. The radial block copolymers have short branches $A_2$-B and long branches $A_1$-$A_2$-B. During the polymerization, the vinylaromatic monomer and the initiator are added twice in two portions, before addition and polymerization of a diene and coupling with a polyfunctional coupling agent Y.

U.S. Pat. No. 6,521,712 proposes glass-clear linear and star-shaped SBC-block copolymers with a balanced toughness/stiffness ratio, and blends with general purpose polystyrene (GPPS). The linear SBC-block copolymers have the structure (I) S1-$(B/S)_1$-$(B/S)_2$-S2, and the star-shaped SBC-block copolymers have one long branch of the structure Sa-Sb—$(B/S)_1$-$[(B/S)_2]_x$-$[(B/S)_3]_y$ or Sa-Sb—$(B/S)_1$-$[(B/S)_2]_x[(B/S)_3]_y$—Sc and short branches of the structure Sb—$(B/S)_1$-$[(B/S)_2]_x$-$[(B/S)_3]_y$ or Sb—$(B/S)_1$-$[(B/S)_2]_x$-$[(B/S)_3]_y$—Sc, where Sa is a long, Sb is a short, and Sc is a very short vinylaromatic block, x, y are 0, 1 and $(B/S)_1$, $(B/S)_2$ etc. are random soft blocks made from diene and vinylaromatic monomers having different relative proportions of vinyl aromatic monomers. Preferably the molar ratio of vinyl aromatic monomer to diene S/B in the block $(B/S)_1$ is from 0.5 to 2 and in the block $(B/S)_2$ is below 0.5.

US 2005/0009990 discloses a mixture having high toughness together with high stiffness comprising linear styrene-butadiene block copolymers of the structure (I) S1-B1-S2 and (II) S3-B2-S4, where S1 is a long vinylaromatic block and each of S2, S3 and S4 is a short vinylaromatic block, and each B1 and B2 is a diene block or a diene-vinylaromatic copolymer block. The mixtures are used for optical media.

US 2011/098401 describes mixtures of styrene-butadiene block copolymers A and B which can be processed to give heat-shrinkable films with high shrinkage capability and with high stiffness/strength. Preferably SBC copolymer A has the structure S—$(B/S)_A$—S or is a single copolymer block $(B/S)_A$ wherein $(B/S)_A$ is a random copolymer hard block composed of 65 to 95 wt.-% vinyl aromatic monomers and 5 to 35 wt.-% dienes and S is a vinylaromatic polymer hard block.

Preferably the SBC block copolymers B are star shaped having short branches of structure $S_e$—$(B/S)_B$ or $S_e$—$(B/S)_B$—$S_s$ and long branches of structure $(B/S)_A$—$S_i$—$(B/S)_B$ or $(B/S)_A$—$S_i$—$(B/S)_B$—$S_s$ linked by way of the soft blocks $(B/S)_B$ or $(B/S)_B$—$S_s$ (US 2011/098401 A1), where $(B/S)_B$ is a random copolymer block composed of 20 to 60 wt.-% vinylaromatic monomers and 80 to 40 wt.-% dienes, $S_e$, $S_i$ are long and $S_s$ is a short vinylaromatic polymer block. All examples show asymmetrical star-shaped block copolymers B having one long branch and 3 short branches.

Shrink films produced from the SBC polymers or polymer compositions according to the afore-mentioned prior art have the tendency to stick when wrapped onto rolls during the production process. This can cause various technical problems.

For the production of shrink films, often mixtures of a tough SBC component and a stiff SBC component, optionally together with general purpose polystyrene, are blended and extruded to a film. In a next online step, the film is heated by hot air and stretched orthogonal (opposite) on the extrusion direction by a factor 5 to 6. Finally, the edges are cut and the films are wrapped on big rolls. Later, the films are cut into smaller rolls and printed. Finally the printed films are cut into the dimensions of labels, glued and shrinked around a container (e.g. a bottle).

Materials according to the prior art often showed an increased blocking of the stretched film when it was winded on a roll. In some cases, it was even impossible to unwind the roll after several days. Very high amounts (more than 1 to up to 3 wt.-%) of antiblocking agents (e.g. HIPS, fatty acid derivatives) were needed in the formulation to make wrapped films processable. These additives impacted the printability of the films afterwards in a very negative way (unprinted spots due to apolar zones). In addition, the high HIPS content also increases haze and reduced gloss (optical properties).

Object of the invention is to provide a material based on styrene butadiene block-copolymers (SBC) which is suitable for the production of shrink films with good mechanical properties and with reduced layer-to-layer stickiness when wrapped onto rolls during the production process and avoids or at least reduces the need of anti-blocking additives.

One aspect of the invention is a polymer composition comprising (or consisting of) components (a), (b) and (c):
a) 45 to 100 wt.-% of component a) consisting of:
   a1) 20 to 80 wt.-% of at least one star-shaped block copolymer A1 having:
      two short branches consisting of a single copolymer block $(B/S)_{Ai}$ made from 65 to 95 wt.-% vinylaromatic monomers and 35 to 5 wt.-% dienes and having a glass transition temperature $Tg_A$ in the range from 40 to 90° C., and
      two long branches of the structure $S_t$—$[(B/S)_A]_n$-$(B/S)_{Ai}$ or $[(B/S)_A]_n$-$(B/S)_{Ai}$, linked (to one another via a coupling agent) by way of the inner blocks $(B/S)_{Ai}$, where the block $S_t$ is made from 95 to 100 wt.-% of vinylaromatic monomers and 0 to 5 wt.-% of dienes; the block $[(B/S)_A]_n$ consists of one or more different or identical copolymer blocks $(B/S)_A$, each made from 65 to 95 wt.-% vinylaromatic monomers and 35 to 5 wt.-% dienes and have a glass transition temperature $Tg_A$ in the range from 40 to 90° C.; n is a regular number of at least 1, preferably n=2 to 10, more preferably n=2 or 3, most preferably n=2, and the block $(B/S)_{Ai}$ is as defined above, wherein the block $(B/S)_{Ai}$ has a number average molar mass M, in the range of from 5000 to 15000 g/mol and the entire block $[(B/S)_A]_n$ has a number average molar mass M, of 50000 to 150000 g/mol; and
   a2) 80 to 20 wt.-% of at least one star-shaped block copolymer A2, which has (in essence) two short branches of structure $S_e$—$(B/S)_B$ and two long branches of structure $(B/S)_{Ae}$—$S_i$—$(B/S)_B$, linked (to one another via a coupling agent) by way of the blocks $(B/S)_B$,
      wherein the polymer blocks $S_e$ and $S_i$ are identical; the (hard) polymer blocks $S_e$ and $S_i$ are made from 95 to 100 wt.-% of vinylaromatic monomers and of from 0 to 5 wt.-% of dienes; the copolymer block $(B/S)_{Ae}$ is made from 65 to 95 wt.-% vinylaromatic monomers and 35 to 5 wt.-% dienes and has a glass transition temperature $Tg_A$ in the range from 40 to 90° C.; and the homo- or copolymer blocks $(B/S)_B$ are each made from 0 to 25 wt.-%, preferably 1 to 25 wt.-%, vinylaromatic monomers, and 100 to 75 wt.-%, preferably 99 to 75 wt.-%, dienes and have a glass transition temperature $Tg_B$ in the range from −90° to −60° C.;

b) 0 to 55 wt.-% of at least one further thermoplastic polymer TP other than block copolymers A1 and A2; and c) 0 to 5 wt.-% of at least one additive or processing aid;

where the total amount of components (a) and, if appropriate, (b) and/or (c) is 100% by weight, based on the entire polymer composition.

The glass transition temperature Tg is determined by DSC based on DIN EN ISO 11357-2:2014-07. The evaluation has the 2nd heating cycle after quick cooling from 180° C. with a heating rate of 20 K/min.

In the context of the invention, the average molar mass Mn is determined by GPC according to ISO 16014-3:2012 (Low T<60° C. size exclusion with relative calibration method against polystyrene standards). Wt.-% means percent by weight.

The total amount of a1) and a2) is 100 wt.-%, based on component (a).

In the context of the invention "diene" means a conjugated diene. "Butadiene" means 1,3-butadiene.

If, in the polymer composition according to the invention, optional components (b) or (c) are present, the minimum fraction of each component is customarily 0.05 wt.-%.

If an anti-blocking agent is present as component (c), its maximum amount is below 1 wt.-%, based on the entire polymer composition.

Component (a)

Component a) preferably consists of a1) 25 to 50 wt.-%, more preferably 30 to 48 wt. %, most preferred 35 to 45 wt.-% of the at least one, preferably one, block copolymer A1 and a2) 50 to 75 wt.-%, more preferably 52 to 70 wt.-%, most preferred 55 to 65 wt. % of the at least one, preferably one, block copolymer A2.

Block Copolymer A1

Block copolymer A1 generally is a stiff material. Preferably the number-average molar mass Mn of the copolymer block $(B/S)_{Ai}$ is in the range of from 8000 to 13000 g/mol. Preferably the number-average molar mass Mn of the entire block $[(B/S)_A]_n$ is in the range of from 70000 to 150000 g/mol, more preferably 80000 to 150000 g/mol, most preferred 90000 to 145000 g/mol. Preferably the number-average molar mass Mn of the block $S_t$ is in the range from 3000 to 10000, more preferably 4000 to 8000 g/mol.

The block $[(B/S)_A]_n$ consists of n, respectively one or more, preferably 2 to 10, more preferably 2 or 3, most preferably two different or identical copolymer blocks $(B/S)_A$, where the blocks $(B/S)_A$ can differ in their molar masses and/or in their vinylaromatic/diene ratio.

Preferably, the block $[(B/S)_A]_n$ has the structure $(B/S)_{A1}$-$(B/S)_{A2}$-$(B/S)_{A3}$ or more preferably $(B/S)_{A1}$-$(B/S)_{A2}$. In said structures the vinylaromatic/diene ratio can differ in the individual blocks B/S. Accordingly, the long branches preferably have the structure $S_i$—$(B/S)_{A1}$-$(B/S)_{A2}$-$(B/S)_{A3}$-$(B/S)_{Ai}$ or $(B/S)_{A1}$-$(B/S)_{A2}$-$(B/S)_{A3}$-$(B/S)_{Ai}$ or more preferably $(B/S)_{A1}$-$(B/S)_{A2}$-$(B/S)_{Ai}$ or in particular preferably $S_i$—$(B/S)_{A1}$-$(B/S)_{A2}$-$(B/S)_{Ai}$.

According to one embodiment the outer block $(B/S)_{A1}$ has a higher number average molar mass Mn than the block $(B/S)_{A2}$.

It is preferable that—independently from each other—the copolymer blocks $(B/S)_A$, and $(B/S)_{Ai}$ are made from 85 to 93 wt.-% of a vinylaromatic monomer, in particular styrene, and from 7 to 15 wt.-% of a diene, in particular isoprene or butadiene. Particular preference is given to butadiene. The glass transition temperature of the copolymer blocks $(B/S)_A$, and $(B/S)_{Ai}$ is preferably in the range from 50 to 80° C., particularly preferably from 60 to 75° C.

Particularly suitable block copolymers A1 are made from 86 to 94% by weight, preferably from 88 to 92% by weight, of vinylaromatic monomers, in particular styrene, and of from 6 to 14% by weight, preferably from 8 to 12% by weight, of diene, in particular butadiene, based in each case on the entire block copolymer.

Preference is given to block copolymers A1 which comprise (or consist of) copolymer blocks $(B/S)_A$ and $(B/S)_{Ai}$ composed of polymerized vinylaromatic monomers and of dienes, with random distribution. These can by way of example be obtained by anionic polymerization using alkyllithium compounds in the presence of randomizers, such as tetrahydrofuran, or potassium salts. Preference is given to use of potassium salts where the molar ratio of anionic initiator to potassium salt is in the range from 25:1 to 60:1, particularly preferably from 30:1 to 40:1. This method can at the same time achieve a low proportion of 1,2 linkages of the butadiene units. Suitable potassium salts are K alcoholates, in particular those soluble in the polymerization solvent, e.g. tert-amyl alcoholate or triethylcarbinolate, or other C-rich tertiary alcoholates.

The proportion of 1,2 linkages of the butadiene units is preferably in the range from 8 to 15%, based on the entirety of the 1,2, 1,4-cis, and 1,4-trans linkages.

It is particularly preferable that the star shaped block copolymer A1 has the following (pseudo-linear) structure:

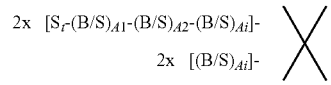

2x $[S_i\text{-}(B/S)_{A1}\text{-}(B/S)_{A2}\text{-}(B/S)_{Ai}]\text{-}$

2x $[(B/S)_{Ai}]\text{-}$ where $S_i$, $(B/S)_{A1}$, $(B/S)_{A2}$, and $(B/S)_{Ai}$ are as defined above and X is a coupling center, which is formed by reaction of the living anionic polymer chain ends (=linked by way of the blocks $(B/S)_{Ai}$) with a polyfunctional coupling agent. Said polyfunctional coupling agent can generally be any suitable polyfunctional compound. It is preferably selected from epoxidized vegetable oils, in particular epoxidized linseed oil or epoxidized soybean oil.

In the case of polymers prepared anionically, the molecular weight is controlled by way of the ratio of amount of monomer to amount of initiator. The initiator can also be added repeatedly after monomer feed has taken place, the result then being a bi- or multimodal distribution. The molecular weights are usually determined by means of gel permeation chromatography (GPC) in THF as solvent, using polystyrene as standard. The star shaped block copolymers A1 are produced via anionic polymerization generally in a nonpolar solvent, where the initiation process uses an initiator which is generally an organometallic compound. The production process uses addition of at least one coupling agent, generally at the end of the polymerization reaction, where a portion of the at least one initiator is added at the start of the polymerization reaction and the remaining portion of the initiator is added at a subsequent juncture.

Said process permits production of the specific block copolymers A1 which in particular feature star-shaped molecular architecture with two identical short and two identical long branches of the star.

Suitable initiators in the anionic polymerization reaction are organometallic compounds, preferably compounds of the alkali metals, particularly preferably of lithium. Examples of initiators are methyllithium, ethyllithium, propyllithium, n-butyllithium, sec-butyllithium, and tert-butyllithium. The organometallic compound is generally added in the form of solution in a chemically inert hydrocarbon. The amount added depends in principle on the desired molar mass of the polymer, but is generally from 0.002 to 5 mol %, based on the monomers. The above amount of initiator is based on the total amount of the initiator used which—as mentioned above—is added in at least two batches. Solvents used are preferably aliphatic hydrocarbons, such as cyclohexane or methylcyclohexane.

The anionic polymerization reaction also generally uses addition of a polar cosolvent (as randomizer), and it is believed here that the cosolvent acts as Lewis base in relation to the metal cation of the initiator. Preferred Lewis bases are polar aprotic compounds such as ethers and tertiary amines.

Examples of particularly effective ethers are tetrahydrofuran and aliphatic polyethers, such as ethylene glycol dimethyl ether and diethylene glycol dimethyl ether. Tertiary amines that may be mentioned are triethylamine, tributylamine, and pyridine. The amount of the polar co-solvent added to the nonpolar solvent is by way of example from 0.5 to 5% by volume. Particular preference is given to an amount of from 0.1 to 0.6% by volume of tetrahydrofuran. An amount of from 0.2 to 0.4% by volume is very particularly preferred in many instances.

The amount added of, and the structure of, the Lewis base determine the copolymerization parameters and the proportion of 1,2-and 1,4-linkages of the diene units. The resultant rubbery block copolymers generally have a proportion of from 20 to 80% of 1,2-linkages and from 80 to 20% of 1,4-linkages, based on all of the diene units.

Preferably, a soluble potassium salt is added (as randomizer)—instead of the cosolvent —and is in particular a potassium alcoholate. It is believed here that the potassium salt interacts by metal exchange with the lithium-carbanion ion pair, thus forming potassium-carbanion compounds which preferentially form adducts with the vinylaromatic monomer, particularly preferably styrene, whereas the lithium-carbanion compounds preferentially form adducts with the diene, particularly preferably butadiene. Since potassium-carbanion compounds are substantially more reactive, even a small fraction, namely from $\frac{1}{10}$ to $\frac{1}{50}$, is sufficient, together with the predominating lithium-carbanion compounds to give a similar average probability of incorporation of vinylaromatic monomers, particularly preferably styrene, and of dienes, particularly preferably butadiene. Preference is given to use of potassium salts where the molar ratio of anionic initiator to potassium salt is in the range from 25:1 to 60:1, preferably from 30:1 to 40:1. Particularly preferably selected is a molar lithium/potassium ratio of from 33 to 39 in order to achieve approximately random incorporation of vinylaromatic monomer, preferably styrene, and diene, preferably butadiene.

It is moreover believed that during the polymerization procedure there is frequent metal exchange between the living chains and also between a living chain and the dissolved salt, and that the same chain forms an adduct on one occasion preferentially with a vinylaromatic monomer, particularly preferably styrene, and in turn on another occasion with a diene, particularly preferably butadiene. The resultant copolymerization parameters are then approximately the same for the vinylaromatic monomer and the diene. Suitable potassium salts are particularly potassium alcoholates, in particular those soluble in the polymerization solvent, e.g. tertiary alcoholates having at least five carbon atoms such as tert-amyl alcoholate or triethylcarbinolate, or other C-rich tertiary alcoholates.

Examples of typical corresponding alcohols are 3-ethyl-3-pentanol and 2,3-dimethyl-3-pentanol. Tetrahydrolinalool (3,7-dimethyl-3-octanol) and 2-methyl-2-butanol (tert-amyl-alcohol) prove to be particularly suitable. Other compounds also suitable in principle alongside the potassium alcoholates are other potassium salts which are inert toward alkyl metal compounds. Mention may be made of dialkylpotassium amides, alkylated diarylpotassium amides, alkyl thiolates, and alkylated aryl thiolates. The block copolymers A1 produced with potassium salts as randomizers generally have a low proportion of from 8 to 15% of 1,2-linkages and from 92 to 85% of 1,4-linkages, based on all of the diene units.

The polymerization temperature is generally from 0 to 100° C., preferably from 30 to 90° C., particularly preferably from 45 to 90°. The polymerization reaction is generally carried out in a plurality of stages, where the initiator is added in a plurality of batches, using a double initiation process. By way of example, the process begins by producing the hard block St. A portion of the monomers is used as initial charge in the reactor, and the polymerization reaction is initiated via addition of a portion of the initiator. In order to achieve a defined chain structure that can be calculated from the amount of monomer and of initiator added, it is advisable to achieve high conversion (above 99%) in the process before the second monomer addition takes place. However, this is not essential.

The sequence of monomer addition depends on the selected block structure. In the case of a batch process, it is preferable to begin by using all of, or a portion of, the solvent, such as cyclohexane, as initial charge, and then to use, as initial charge, the amount of initiator, such as sec-butyllithium, that is required to establish the desired molar mass, plus what is known as a titration amount, which serves to destroy traces of impurities in the solvent and in the tank.

It is then preferable to add the potassium salt, such as potassium tert-amyl alcoholate, preferably dissolved in cyclohexane, or to add the complexing solvent, such as THF to the reactor, and then—in case of long branches with a terminal block $S_t$— to add the first amount of vinylaromatic monomer, in order to produce the block $S_t$. Diene and vinylaromatic monomer are then added, preferably simultaneously.

The addition can take place in a plurality of portions optionally together with further solvent, e.g. for improved heat dissipation, and as a function of the desired constitution.

The random structure, and the constitution, of the block $(B/S)_{A1}$ are determined via the quantitative proportion of diene with respect to vinylaromatic compound, the concentration of the potassium salt, if a potassium salt is used, and the concentration and chemical structure of the Lewis base used as co-solvent, if a Lewis base is used, and also the temperature.

Further blocks $(B/S)_{A2}$, $(B/S)_{A3}$ etc. can then be polymerized onto the growing polymer chain via addition of diene and vinylaromatic monomers. Preferably only the block $(B/S)_{A2}$ is then polymerized onto the growing polymer chain. Then a second initiation process, i.e. the second addition of the initiator, takes place prior to the addition of the diene and vinylaromatic monomers used for polymerizing the block $(B/S)_{Ai}$ onto the growing polymer chain.

In the case of double initiation in the same reactor, the molar mass of the newly initiated polymer (=block $(B/S)_{Ai}$) and of the block $(B/S)_{Ai}$ polymerized onto the growing polymer chain is practically identical.

According to said process, coupling with a coupling agent takes place after the last addition and complete polymerization of diene and vinylaromatic monomer, and the plurality of polymer blocks $(B/S)_{Ai}$ are thus bonded to one another, and the block copolymer A1 having star-shaped molecular architecture is formed.

It is generally possible to use any polyfunctional compound as coupling agent. It is preferable that the coupling agent has been selected from epoxidized vegetable oils, such as epoxidized linseed oil or epoxidized soybean oil, silanes, such as alkoxysilanes, e.g. $Si(OMe)_4$, chlorosilanes, such as $SiCl_4$, $Si(Alkyl)_2Cl_2$, $Si(alkyl)Cl_3$, where alkyl is a $C_1$-$C_4$-alkyl moiety, preferably methyl, halides of aliphatic hydrocarbons, such as dibromomethane or bischloromethylbenzene, tin tetrachloride, polyfunctional aldehydes, such as terephthaldehyde, polyfunctional ketones, polyfunctional esters, such as carboxylic esters, e.g. ethyl acetate, diethyl succinate, dimethyl or diethyl adipate, polyfunctional anhydrides, oligo-epoxides, such as 1,4-butanediol glycidyl ether, activated diolefins, such as diisopropenylbenzene, divinylbenzene, or distyrylbenzene; preferred coupling agents are epoxidized vegetable oils, such as epoxidized linseed oil or epoxidized soy oil.

The coupling agent forms the coupling center X, which is formed by reaction of the living anionic chain ends with one of the abovementioned coupling agents.

The amount of coupling agent is calculated as a function of its functionality and of the amount of initiator used. It is preferable to add the amount of coupling agent needed for reacting all of the living chains, corresponding to the amount of active initiator (total amount of initiator minus titration amount). In the case of ester groups, account has to be taken of the fact that these react with two living chains, whereas in contrast epoxides and haloalkanes and -silanes react with one per functional group. By way of example, epoxidized soybean oil comprises fatty acids esterified in the form of triglyceride having predominantly one or two epoxy groups, and correspondingly predominantly forms bonds with three or four polymer chains, liberating the metal alcoholate of glycerol, since the carboxy group also forms bonds with two further chains.

It is possible to use the same initiator in each initiation step of said process for producing the block copolymer A1. However, it is also possible in principle to use various initiators.

The polymer concentration can be varied widely, but should preferably be selected in such a way that the temperatures at the end of the polymerization reaction for the individual blocks do not exceed values of 100° C. or if they exceed that value then at most for a short time, thus avoiding any significant premature thermal termination. Typical polymer concentrations after the coupling process, in the case of a batch process in a stirred tank, are from 10 to 50% by weight, preferably from 20 to 40% by weight, and particularly preferably from 25 to 35% by weight.

Instead of a stirred tank, preferably in combination with a reflux condenser, where the internal pressure of the tank is preferably lowered to cool the reaction solution via boiling and reflux of the solvent, it is in principle also possible to use other types of reactor, for example a loop reactor in combination with a cooled section, such as a heat exchanger, or to use a stirred tank in combination with an external heat exchanger. Instead of producing the block copolymers A of the invention in a batch process, they can be produced in a continuous process via, for example, arrangement in series of the reactors listed above in various combinations, or in a tubular reactor with preferably static mixing elements, or via a combination of tubular reactor and the reactors listed above. The number of reaction zones is preferably the same as the number of different monomer additions plus the coupling agent addition.

At the start, and at the appropriate points, the initiator system, generally comprising initiator and randomizer and optionally further solvent, is additionally mixed; it is preferable here to add the solvent to the monomer feeds so that the monomer is in dilute form before it reaches the reactor.

In one preferred embodiment, the polymer concentration is kept constant in the range from 15 to 35% by weight along the reactor cascade. In another preferred embodiment, the polymer concentration is increased to from 36 to 50% by weight through the final monomer addition.

Thus, the process for the preparation of block copolymer A1 is characterized by the following features:
a) a double initiation,
b) a coupling step after the last (=(n+1)), preferably the third addition and complete polymerization of a combination of vinylaromatic monomer and a diene, and
c) the second initiation process placed before the last, preferably the third, addition and polymerization of a combination of vinylaromatic monomer and a diene.

The molar ratio of the first and the second initiation process also plays a part in said process in respect of the structure of the block copolymer A1 (initiation ratio). In the case of the star having four arms, preference is given to a ratio from 0.9:1 to 1.5:1, in particular 1.2:1, where, on average, two $S_i(B/S)_{A1}$-$(B/S)_{A2}$-$(B/S)_{Ai}$ branches and two $(B/S)_{Ai}$ branches polymers have been bonded (pseudolinear architecture), when the final monomer addition after the second initiation process is addition of a vinylaromatic monomer and a diene.

The further work-up of the block copolymer A1 takes place by conventional processes. It is advisable here to operate in a stirred tank and, after the coupling process, optionally use a small amount of alcohol, such as isopropanol, to protonate the possible small amounts of residual carbanions and the polymer-bonded alcoholates which may have been produced in the coupling step, in order to avoid formation of deposits in the tank and discoloration of the product, and to lower the viscosity of the solution, and, prior to further work-up, to use $CO_2$/water in a conventional manner to acidify the product slightly, so that the product subsequently obtained is glass-clear with no color tinge.

It is also useful to stabilize the polymer with a free-radical scavenger or preferably with a combination of free-radical scavengers (e.g. C-radical scavengers, such as α-tocopherol (vitamin E), Sumilizer® GM and Sumilizer® GS, in combination with O-radical scavengers, such as Irganox® 1010 and Irganox® 1076, BASF SE) and with a secondary oxidation inhibitor (e.g. commercially available products preferably based on phosphite, an example being triisononylphenyl phosphite (TNPP) or Irgafos® 168, BASF SE), and use the conventional processes to remove the solvent, and extrude and pelletize the product.

One preferred process for removing the solvent is to decrease the concentration of the solvent in stages, where, if the polymerization reaction uses a batch process, the solution is advantageously first placed into intermediate storage in a buffer tank, and then is preferably after passage through a pump heated by way of one or more heat exchangers in series to a temperature which is preferably from 100 to 140° C. above the boiling point of the solvent (this being from 180 to 220° C. in the case of cyclohexane), in order then after passage through a pressure-retention valve to be transferred via a short pipe with vapor velocities which are preferably from 100 to 350 m/s into a depressurization vessel of which the pressure and temperature are preferably adjusted in such a way that the solvent just begins to condense and the surface has a coating of a solvent film, i.e. is not dry; for cyclohexane as solvent, it is preferable here to select temperatures of from 100 to 140° C. and pressures of from 1.6 to 4.3 bar.

The solvent vapor is preferably discharged upward out of the depressurization vessel, and condensed and passed for work-up, while the polymer solution, the concentration of which is now about 70-95%, gives a precipitate in the form of flakes on the base of the vessel, from where it can be conveyed onward by way of example by a gear pump into the next heat exchanger and can be reheated, preferably to from 170 to 230° C.

The solution is then again depressurized by way of a pressure-retention valve onto the screws of a preferably twin-screw extruder, where the solvent vapor is discharged by way of vent domes upstream of and downstream of the polymer feed point. The concentration of the solvent is then preferably further reduced in extruder segments with barrier screw elements which seal against one another, while the vacuum continues to improve and upstream of the extruder head is preferably from 1 to 30 mbar, and small amounts of water are preferably injected, until the solvent content achieved is preferably <3000 ppm, particularly preferably <2000 ppm.

At the end of the extruder, the melt can be either strand-pelletized or underwater-pelletized, preference being given here to the underwater pelletization process. However, it is also possible to remove the solvent by way of other processes, for example by way of what is known as a "Filmtruder" in combination optionally with an extruder, or via steam stripping, as is conventional in the case of most styrene-based thermoplastic elastomers. In this case, polymer flakes are obtained.

The pellets or the flakes can, like other types of rubber, be protected from adhesion by using an antiblocking agent, such as Acrawax® (of Lonza), Besquare®, Aerosil® (of Evonik) and/or tricalcium phosphate.

According to said process the block copolymer A1 can be produced with good space-time yields. The space-time yield (STY) for a batch polymerization process, i.e. from the juncture at which the first monomer charge has been combined with the first initiator charge until conclusion of the coupling process, i.e. the juncture at which optional addition of alcohol and evacuation of the reactor can be started, is generally from 0.5 to 3 h, preferably from 1 to 2.5 h.

The Block copolymers A1 can preferably be used for the production of shrink films.

Block Copolymer A2

One further subject of the invention is the (tough) block copolymer A2. Block copolymer A2 preferably has a symmetrical star-shaped structure.

The melt mass flow index (=MFI, measured on a polymer melt at 220° C. and 5 kg load according to ISO 1133-1:2011) of block copolymer A2 is generally in the range of from 8 to 15 ml/10 min, preferably from 9 to 14 ml/10 min.

Preferably the vinylaromatic monomer used for the preparation of blocks $S_e$, $S_i$, $(B/S)_B$ and $(B/S)_{Ae}$ is styrene, and the diene used for the preparation of blocks $(B/S)_B$ and $(B/S)_{Ae}$ is preferably isoprene or butadiene, in particular butadiene.

The number-average molar mass Mn of the hard polymer blocks $S_e$ or $S_i$ of the block copolymer A2 is generally in the range from 5000 to 30000 g/mol. The blocks occur either terminally ($S_e$) or else between ($S_i$) the blocks $(B/S)_{Ae}$ and $(B/S)_B$. The short $S_i$ block maximizes incompatibility with the homo- or copolymer block $(B/S)_B$ acting as soft phase. This means that the intermediate phase that forms between the hard phase and the soft phase in the solid can be kept small. The proportion by weight of phases, that soften in the range of room temperature. i.e. from 10 to 40° C., can thus be kept small which is beneficial for a low natural shrinkage at temperatures below 40° C. The molecular weights are usually determined by means of gel permeation chromatography (GPC) in THF as solvent, using polystyrene as standard.

The polymer blocks $S_e$ and $S_i$ have the same constitution and number-average molar masses Mn.

The number-average molar mass Mn of the copolymer block $(B/S)_{Ae}$ is generally in the range from 30000 to 100000 g/mol, preferably in the range of from 35000 to 90000 g/mol, more preferably in the range from 40000 to 80000 g/mol.

The constitution and properties of the copolymer block $(B/S)_{Ae}$ correspond to those of the copolymer block $(B/S)_A$ described for the block copolymer A1 above.

The copolymer block $(B/S)_{Ae}$ can be a block $[(B/S)_{Ae}]_n$ consisting of n, respectively one or more, preferably 1 to 10 different or identical copolymer blocks $(B/S)_{Ae}$, where the blocks $(B/S)_{Ae}$ can differ in their molar masses and/or in their vinylaromatic/diene ratio. Preferably, the block $(B/S)_{Ae}$ is a single block.

It is preferable that the copolymer block $(B/S)_{Ae}$ is made from 85 to 93 wt.-% of a vinylaromatic monomer, in particular styrene, and from 7 to 15 wt.-% of a diene, in particular isoprene or butadiene. Particular preference is given to butadiene.

The glass transition temperature of the copolymer block $(B/S)_{Ae}$ is preferably in the range from 50 to 80° C., particularly preferably from 60 to 75° C.

The number-average molar mass Mn of the homo- or copolymer block $(B/S)_B$ is generally in the range of from 5000 to 50000 g/mol; preferably from 10000 to 40000 g/mol, more preferably 12000 to 35000 g/mol.

It is preferable that the block $(B/S)_B$ is a copolymer block made from 1 to 25 wt.-%, more preferably 5 to 20 wt.-%, most preferred 10 to 20 wt.-% vinylaromatic monomers, in particular styrene, and 99 to 75 wt.-%, more preferably 95 to 80 wt.-%, most preferred 90 to 80 wt.-% dienes, preferably isoprene or butadiene, in particular butadiene.

The glass transition temperature $Tg_B$ of the homo- or copolymer block $(B/S)_B$ is preferably in the range from −80 to −65° C.

The distribution of the polymerized units of vinylaromatic monomers and dienes in the copolymer blocks $(B/S)_B$ and $(B/S)_{Ae}$ of the block copolymer A2 is preferably random. These can by way of example be obtained by anionic polymerization using alkyllithium compounds in the presence of randomizers, such as tetrahydrofuran, or potassium salts as described above for the blocks $(B/S)_A$ and $(B/S)_{Ai}$ of the block copolymer A1.

The proportion of the entirety of all of the blocks $(B/S)_B$(=soft phase) can be from 26 to 37 wt.-%, based on the entire star-shaped block copolymer A2.

Preferred are star-shaped block copolymers A2 where the proportion of the entirety of all of the blocks $(B/S)_B$(=soft phase) is from 30 to 37 wt.-%, preferably 31 to 35 wt.-%, more preferably 32 to 33 wt.-%, based on the entire star-shaped block copolymer A2.

More preferred are star-shaped block copolymers A2 according to the invention, wherein the (hard) polymer blocks $S_e$ and $S_i$ are made from 95 to 100 wt.-% of vinylaromatic monomers, and 0 to 5 wt.-% of dienes, the blocks $S_e$ and $S_i$ have number average molar masses M, in the range from 5000 to 30000 g/mol; the (hard) copolymer block $(B/S)_{Ae}$ is made from 65 to 95 wt.-% vinylaromatic monomers and 35 to 5 wt.-% dienes and has a glass transition temperature $Tg_A$ in the range from 40 to 90° C. and a number-average molar mass M, in the range of from 30000 to 100000 g/mol, and the (soft) homo- or copolymer blocks $(B/S)_B$ are each made from 0 to 25 wt.-%, preferably 1 to 25 wt.-%, vinylaromatic monomers and 100 to 75 wt.-%, preferably 99 to 75 wt.-% dienes and have a glass transition temperature $Tg_B$ in the range from −90 to −60° C., preferably −80 to −65° C., and a number-average molar mass M, in the range of from 5000 to 50000 g/mol.

In particular preferred are the afore-mentioned star-shaped block copolymers A2 where the proportion of the entirety of all of the blocks $(B/S)_B$(=soft phase) is from 30 to 37 wt.-%, preferably 31 to 35 wt.-%, more preferably 32 to 33 wt.-%, based on the entire star-shaped block copolymer A2.

Particularly suitable block copolymers A2 are made from 50 to 80 wt.-%, preferably from 60 to 75 wt.-%, of vinylaromatic monomers, in particular styrene, and of from 20 to 50 wt.-%, preferably from 25 to 40 wt.-%, of diene, in particular butadiene, based in each case on the entire block copolymer.

It is particularly preferable that the block copolymer A2 has the following symmetrical star shaped structure:

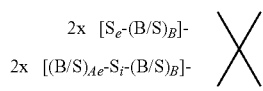

where Se, $S_i$, $(B/S)_{Ae}$ and $(B/S)_B$ are as defined above and X is a coupling center, which is formed by reaction of the living anionic polymer chain ends (=linked by way of the blocks $(B/S)_B$) with a polyfunctional coupling agent. Said polyfunctional coupling agent can generally be any suitable polyfunctional compound. Polyfunctional coupling agents can be e.g. polyfunctional aldehydes, ketones, esters, anhydrides or epoxides.

It is preferably selected from epoxidized vegetable oils, in particular epoxidized linseed oil or epoxidized soybean oil.

The star-shaped block copolymers B are prepared by sequential anionic polymerization method using double initiation.

Thus, the process for the preparation of block copolymer A2 is characterized by the following features:
a) a double initiation,
b) a coupling step after the addition and polymerization of a diene and optionally a vinylaromatic monomer used for the preparation of homo- or copolymer block $(B/S)_B$, and
c) the second initiation process placed before the addition and polymerization of the vinylaromatic monomer used for the preparation blocks $S_i$ and $S_e$.

The molar ratio of the first and the second initiation process also plays a part in said process in respect of the structure of the block copolymer A2 (initiation ratio). In the case of the star having four arms, preference is given to a ratio of from 0.9:1 to 1.5:1, in particular 1:1, where, on average, two $(B/S)_{Ae}$—$S_i$—$(B/S)_B$ branches and two $S_e$—$(B/S)_B$ branches polymers have been bonded (symmetrical star structure), when the final monomer addition after the second initiation process is addition of a diene and optionally a vinylaromatic monomer.

The preparation of star-shaped block copolymers by sequential anionic polymerization is commonly known (cp. U.S. Pat. No. 6,593,430, col. 3, I. 1 to col. 4, I. 45). The preparation of the star-shaped block copolymers A2 according to the invention corresponds in general (initiator, solvent, randomizer, reaction conditions (e.g. polymerization temperature), coupling, batch or continuous process, work up) to the preparation as disclosed for block copolymers A1 above, apart from the sequence of the monomer feed and the monomer composition, to which preparation is in particular referred.

Block copolymers A2 are tough materials which can preferably be used for the production of shrink-wrap films.

Thermoplastic Polymers (TP)

The polymer composition of the invention optionally comprises, as component b) from 0 to 55 wt.-%, preferably from 0 to 45 wt.-%, more preferably from 1 to 40 wt.-%, most preferably from 5 to 35 wt.-%, of at least one, preferably one or two, thermoplastic polymer TP other than block copolymers A1 and A2.

Particularly suitable thermoplastic polymers are styrene polymers, such as standard polystyrene (GPPS), styrene-acrylonitrile copolymers (SAN), styrene-methyl methacrylate copolymers (S/MMA) or polymethacrylates, such as PMMA, polyesters, such as polyethylene terephthalate (PET), polyolefins, such as polyethylene or polypropylene, or polyvinyl chloride (PVC), or semicrystalline materials. Preferably used are styrene polymers, in particular GPPS.

It is also possible to use polyacrylates, such as PnBA, and other acrylate rubbers, ethylvinyl acetate polymers (EVA), etc. The thermoplastic polymers TP can be admixed to improve stiffness, solvent resistance, printability, antiblocking properties, recyclability, and cling properties.

It is also possible to use thermoplastic elastomers (TPE), for example linear or star-shaped, hydrogenated or non-hydrogenated styrene-butadiene or styrene-isoprene block copolymers other than A1 and A2. Suitable block copolymers are available commercially as Kraton® D, Kraton® G, Styrolux® GH62 or Styroflex®. Addition of thermoplastic elastomers generally improves the toughness of the polymer composition of the invention.

Additives and/or Processing Aids

Additives and/or processing aids which can be optionally present as component c) in the inventive polymer composition are in particular stabilizers, plasticizers, antiblocking agents, dyes and UV absorbers.

Preferred is the use of a stabilizer, in particular oxygen radical scavengers such as Irganox® 1010, Songnox® 1010, Irganox 1076, Irganox 565 and blends thereof, carbon radical scavengers such as Sumilizer® GS, Sumilizer GM and blends thereof, and/or secondary stabilizers such as Irgafos® 168. Said stabilizers are commercially available. The aforementioned stabilizers are preferably used in amounts of 0.01 to 0.7 wt. %, more preferably 0.03 to 0.5 wt.-%, based on the entire polymer composition.

Furthermore preferred is the use of at least one, preferably one, plasticizer. Preferably used as plasticizer in the inventive polymer composition is a homogeneously miscible oil or oil mixture, in particular mineral oil (or white oil) or dioctyl adipate.

The afore-mentioned plasticizers are preferably used in amounts of 0.05 to 0.80 wt.-%, more preferably 0.1 to 0.7 wt.-%, based on the entire polymer composition.

The use of an anti-blocking agent is less preferred. Its maximum amount is below 1 wt. %, based on the entire polymer composition. Preferably the polymer composition according to the invention does not comprise an anti-blocking agent.

Process for the Preparation of the Polymer Compositions

One further subject of the invention is a process for the preparation of the polymer composition according to the invention. The polymer compositions according to the invention can be obtained by mixing component a) and optional components b) and c) by any known method. However, it is preferable when the components are blended by melt mixing, for example conjoint extrusion, kneading or preferably a twin screw extruder, more preferably a counter-rotating twin screw extruder. For this process component a) can be used as a premixture of a1) and a2) or the individual block-copolymers A1 and A2 are used and blended as stated hereinbefore optionally by addition any of components the b) and c). This is usually done at temperatures in the range of from 160° C. to 300° C., preferably from 180° C. to 250° C., in particular 200 to 220° C.

A further subject of the invention is the use of the polymer compositions according to the invention for the production of films, in particular shrink films. The preparation of shrink films is commonly known. Processing may be carried out using the known processes for thermoplastic—in particular SBC-processing, in particular production may be effected by thermoforming, extrusion, injection molding, calendaring, blow molding, compression molding, preferably by extrusion to films.

The polymer compositions of the invention are highly transparent and are particularly suitable for the production of shrink films.

Transmission electron microscopy (TEM) pictures of a film made from polymer compositions according to the invention show a cylinder morphology, which is worm-like distorted (FIGS. 2 and 3) due to the matrix dilution effect of the added stiff component (block copolymer A1) preventing regular packing of the domains.

The polymer compositions of the invention exhibit a good stiffness-toughness relationship, in particular a high E-modulus in both directions so keeping dimensional stability during the shrink film processing and a high strain at break (in and opposite to extrusion direction) allowing an easy stretching.

Moreover, the force to slide two surfaces of the stretched film over each other, compressed by a force of 200N, is low and is therefore less prone to blocking in case of wrapping.

The polymer composition of the invention is also particularly suitable for the production of multilayer films via coextrusion. The abovementioned thermoplastic polymers TP are likewise suitable for the various layers, and the mixture of the invention can be used here in the form of backing layers or in the form of external layers. The additional layers are in particular used for surface modification, antiblocking properties, higher stiffness, or modified/reduced permeability.

The invention is further illustrated by the claims and the following examples.

Analytical Methods

The melt mass flow index (=MFI, [ml/10 min]) is measured on a polymer melt at 200° C. and 5 kg load according to ISO 1133-1:2011.

All used solvents and monomers were dried and purified prior to use.

Block Copolymer A1

A star-shaped block copolymer A1 of the structure $[S_t—(B/S)_{A1}-(B/S)_{A2}-(B/S)_{Ai}]_2 X$ $[(B/S)_{Ai}]_2$ was prepared by sequential anionic polymerization of styrene (monomers S1 to S4) and butadiene (monomers B1 to B3) (cp. Table 1), and subsequent coupling using epoxidized soybean oil. 4785 ml of cyclohexane were used as initial charge (ic) and titrated to the end point at 60° C. with 1.6 ml of sec-butyllithium (BuLi ic), and cooled to 40° C. before adding 6.73 ml of a 1.4 M sec-butyllithium solution, (BuLi 1) for initiation (Ini1), and 2.29 ml of a 0.1175 M potassium tert-amyl alcoholate (PTA) solution, as randomizer.

Next, the initiator mixture was then admixed and the mixture was cooled to 40° C. In a next step, 50 gram styrene was added and the polymerization reaction was allowed to run to complete monomer consumption (identified by a decrease in temperature of the reaction mixture). In a next step, 55 gram butadiene and 445 gram styrene were added simultaneously and the polymerization reaction was allowed to run to complete monomer consumption (identified by a decrease in temperature of the reaction mixture).

In a next step, again 25 gram butadiene and 225 gram styrene were added simultaneously and the polymerization reaction was allowed to run to complete monomer consumption (identified by a decrease in temperature of the reaction mixture).

Next, the second initiator mixture (Ini 2) was added by dosing 2.69 ml of a 1.4 M sec-butyllithium (BuLi 2) solution to the reaction, followed by 0.917 mL of a 0.1175 M potassium tert-amyl alcoholate (PTA) solution, as randomizer, while stirring. In a next step, again 20 gram butadiene and 180 gram styrene were added simultaneously and the polymerization reaction was allowed to run to complete monomer consumption (identified by a decrease in temperature of the reaction mixture).

Finally, 1.88 g of Edenol® D82 disolved in 10 mL cyclohexane was added as coupling agent and allowed to react for 10 minutes. Finally, the mixture was terminated using 0.5 ml of isopropanol and acidified with $CO_2$/water, and a stabilizer solution (Irganox® 1010) was added. Analytical data: MFI=12 ml/10 min

TABLE 1

| | Block copolymer A1 (composition and sequence of addition) | | | | | | | | |
|---|---|---|---|---|---|---|---|---|---|
| | Ini 1 BuLi1 | 1st block $S_t$ | 2nd block $(B/S)_{A1}$ | | 3rd block $(B/S)_{A2}$ | | Ini 2 BuLi 2 | 4th block $(B/S)_{Ai}$ | |
| SBC | (1.4M) wt.-% (phm) | S1 wt.-% | B1 wt.-% | S2 wt.-% | B2 wt.-% | S3 wt.-% | (1.4M) wt.-% (phm) | B3 wt.-% | S4 wt.-% |
| A1 | 0.505 | 5 | 5.5 | 44.5 | 2.5 | 22.5 | 0.202 | 2 | 18 | phm = 'per hundred parts by weight of monomer' (wt.-% of component (initiator, coupling agent etc.) is calculated on the total mass of the monomers)

Block Copolymer A2

The polymers were anionically polymerized in a 10 liter reactor under nitrogen atmosphere. After loading of cyclohexane as a solvent a start temperature of 60° C., sec-butyllithium (BuLi1) was added as an initiator followed by the randomizer potassium tert-amylate (KTA1). Next, the first amount of monomers styrene (S1) and butadiene (Bu1) was added to polymerize the first block. When the polymerization of the first block was finished, verified by the end of the temperature increase, the second amount of initiator (BuLi2) and randomizer (KTA2) was added followed by the next amount of styrene (S2). When the polymerization of these monomers was finished, verified by the end of the temperature increase, the subsequent amount of styrene (S3) and butadiene (Bu3) was added.

During the polymerization, the ratio initiator (total BuLi (1 and 2) to randomizer (KTA) is kept at 35 to 1. Finally, the reaction was terminated with epoxydized soybean oil as coupling agent (mmol initiator/ml coupling agent is 16/1). Afterwards, 1.0 wt.-% of solid $CO_2$ and 0.5 wt.-% of water was added and the polymerization solution was vigorously mixed. Next, stabilizers (0.2 wt.-% Sumilizer® GS and 0.2 wt.-% Irganox®) were added. The ratio initiator to KTA was kept at 35 to 1 during the whole polymerization. The molar mass was adjusted to reach a MFI of 8 to 15 ml/10 min.

The solid content in the polymerization solution at the end of the polymerization is 30 wt.-%. The solvent was removed from the polymer solution by a degassing extruder and the polymer strand was pelletized.

TABLE 2

Block copolymer A2 (composition and sequence of addition)

| SBC A2 | BuLi 1 solution (1.4M wt-% phm) | Molar ratio BuLi1/ KTA1 | block 1 S1 % | block 1 Bu1 % | BuLi 2 solution (1.4M wt-% phm) | Molar ratio BuLi1/ BuLi2 | Molar ratio BuLi2/ KTA2 | block 2 S2 % | block 3 Bu3 % | block 3 S3 % |
|---|---|---|---|---|---|---|---|---|---|---|
| A2-3 | 0.507 | 35 | 47.20 | 5.25 | 0.507 | 1 | 35 | 20.75 | 26.80 | 0.00 |
| A2-2 | 0.507 | 35 | 44.32 | 4.93 | 0.507 | 1 | 35 | 18.75 | 32.00 | 0.00 |
| A2-1 | 0.507 | 35 | 44.32 | 4.93 | 0.507 | 1 | 35 | 18.75 | 26.00 | 6.00 |
| A2-4 | 0.302 | 35 | 42.36 | 4.71 | 0.681 | 0.44 | 35 | 22.53 | 21.77 | 8.63 |

Block copolymer A2-4 is a star shaped block copolymer B according to US 2011/098401 A1 (claim 10).

SBC Polymer Compositions

The tough SBC block copolymers A2-1, A2-2, A2-3 were separately blended with 20 wt.-% of the stiff block copolymer A1 on a counter-rotating twin-screw extruder at from 200° C. to 220° C. and extruded to films of 250 μm thickness.

Subsequently, the films were cut into strips of at least 10 cm length and 5 cm width and placed in the damping jaws of a tensile testing machine with free clamped length of 5 cm.

The strips were subjected to tensile strain at 80° C. opposite to extrusion direction in the tensile testing machine by a stretching factor of 5.5, and rapidly cooled in the stretched state to 23° C.

All mechanical properties (see Table 3), i.e. Young's modulus (E-modulus) and stress at break, were determined on the stretched films and parallel to the extrusion direction according to DIN EN ISO 527-1:2012.

TABLE 3

Mechanical Test Data

| | Opposite to extrusion direction | | | In extrusion direction | | |
|---|---|---|---|---|---|---|
| Tough SBC A2 | E-Modulus MPa | Strain at break % | Stress at break MPa | E-Modulus MPa | Strain at break % | Stress at break MPa |
| A2-3 | 1554 | 96 | 28 | 1359 | 17 | 21 |
| A2-2 | 1396 | 269 | 27 | 1034 | 67 | 16 |
| A2-1 | 1363 | 242 | 27 | 1029 | 424 | 20 |

The tough SBC block copolymers A2-1, A2-2, A2-3 were separately blended with varying amounts (see table 4) of the stiff SBC block copolymer A1 on a counter-rotating twin-screw extruder at from 200° C. to 220° C. and extruded to films of 250 μm thickness. Subsequently, the films were cut into strips of at least 10 cm length and 5 cm width.

The different films of the SBC polymer blends are assessed in an experiment where the force to slide two surfaces of the film over each other, compressed by a force of 200N, at a constant rate is measured (cp. table 4). In that test trial setup the upper and lower clamp have 1 kN clamp force and the middle clamp 200 N clamp force.

TABLE 4

Sliding Test Data

| tough SBC A2 | stiff SBC A1 (wt.-%) | Sliding force (N) |
|---|---|---|
| A2-3 | 10 | 10.28 |
| | 20 | 8.77 |
| | 30 | 8.03 |
| A2-2 | 20 | 8.11 |
| | 30 | 7.44 |
| | 40 | 6.26 |
| A2-1 | 20 | 9.39 |
| | 30 | 8.91 |
| | 40 | 8.84 |

Table 5 shows the sliding force measured on the pure tough material SBC A2-1 and comparative tough star-shaped SBC block copolymer B 16 of US 2011/098401.

TABLE 5

| | Sliding force (N) | | | |
|---|---|---|---|---|
| SBC | 1st trail | 2nd trail | 3rd trail | Average |
| A2-1 | 17.5 | 17.6 | 15.1 | 16.7 |
| B16 | 28.3 | 30.6 | 39.6 | 32.8 |

FIGURES

FIGS. 1 to 5 show TEM pictures which show the morphology of blends of stiff and tough SBC block copolymers according to the prior art and blends according to the invention.

For the preparation of the films shown in FIGS. 1 to 3, 100 nm slices taken from compression molded plates (5 min, 200° C., 40 bar+1d annealing at 25° C.) of the blends were stained with $OSO_4$ (-> the butadiene rich phases are black, the styrene phases are white). The voltage of the equipment was 200 kV.

For the preparation of the films shown in FIGS. 4 and 5, the components used for the blends were pre-compounded on a counter-rotating twin-screw extruder at from 200° C. to 220° C. and subsequently casted as a 225 μm thick film using a single screw extruder.

Then, the films were stretched on a tentering frame by fivefold at 90° C. Next, the films were stained with $OSO_4$ and cut in form of slices of 100 nm thickness and investigated in TEM at 200 kV.

The morphology of this prior art blend is lamellar.

Figure 1:
FIG. 1 shows a TEM picture of a film made from a blend according to current state of the art (US 2011/098401 A1), 70 wt.-% tough star-shaped SBC block copolymer B 16 mixed with 30 wt.-% of stiff linear SBC block copolymer A.
Figure 2:
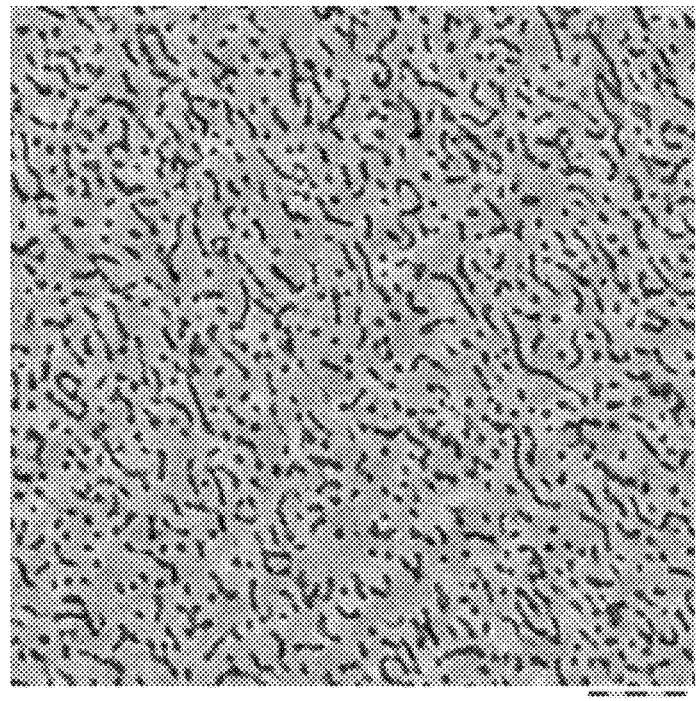
Figure 3:
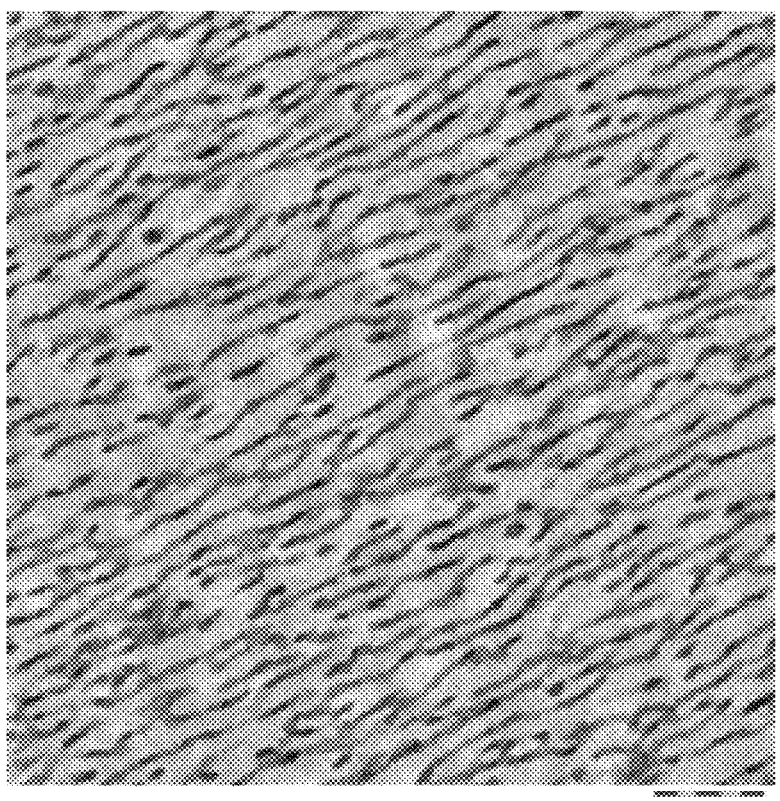

FIG. 2 (opposite to extrusion direction) and 3 (parallel to extrusion direction) show TEM pictures of a cross-section of a film made from a blend according to the invention, tough SBC A2-1 mixed with 40 wt.-% stiff SBC A1. The TEM pictures according to FIGS. 2 and 3 show a cylinder morphology, which is worm-like distorted due to the matrix dilution effect of the added stiff component (block copolymer A1) preventing regular packing of the domains.

Figure 4:
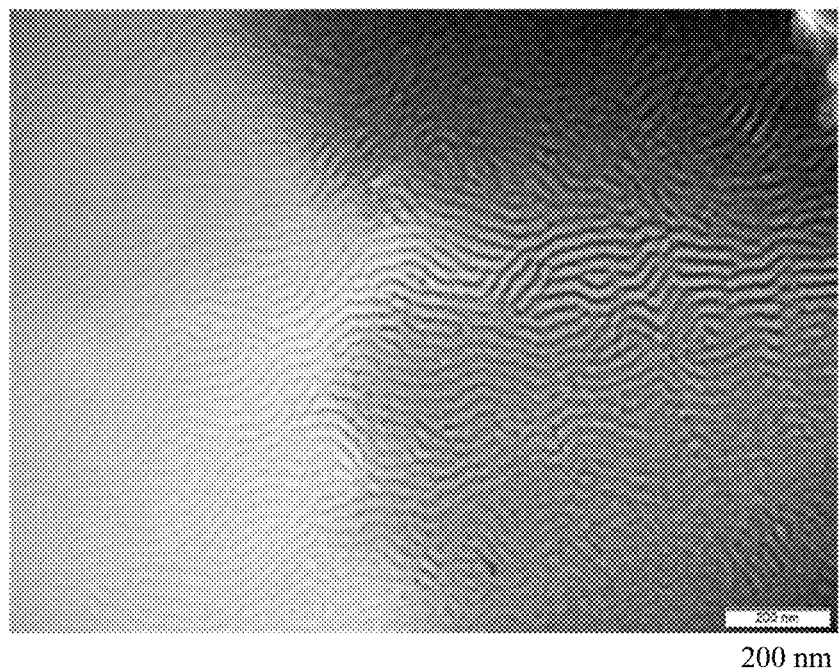

FIG. 4 shows a TEM picture of a film made from a blend according to US 2011/098401 A1 (70 wt.-% tough star-shaped SBC block copolymer A2-4 mixed with 30 wt.-% of stiff linear SBC block copolymer A). The TEM picture shows a clear laminar morphology with chances for the butadiene-rich soft phases (dark regions) to be on the surface and to cause stickiness.

Figure 5:
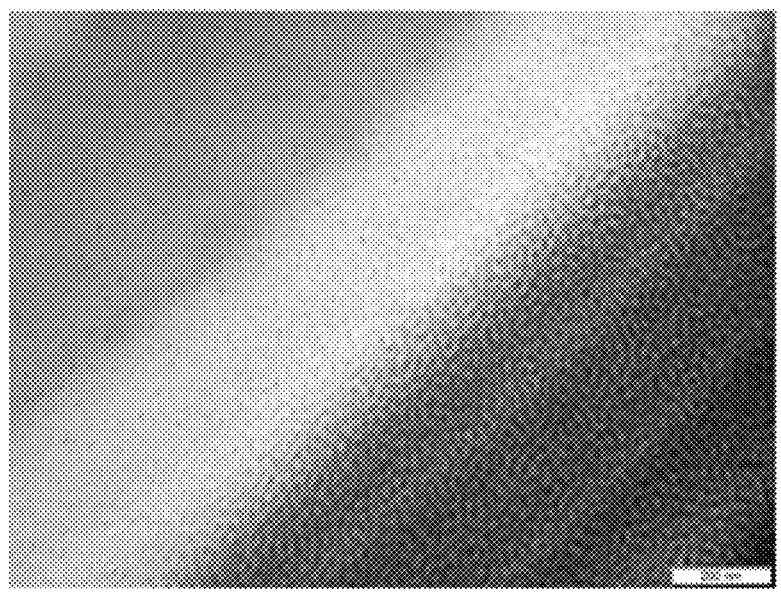

FIG. 5 shows a TEM picture of a film made from a further blend according to the invention (70 wt.-% tough star-shaped SBC block copolymer A2-1 mixed with 30 wt.-% of stiff SBC block copolymer A1). The TEM picture shows a different morphology with a more continuous styrene-rich hard phase and the butadiene-rich soft phases dispersed in that, resulting in a surface dominated by styrene-rich hard phases with less stickiness because of the higher $T_g$. Due to the $OSO_4$, the styrene appears white and the butadiene appears black in the TEM picture. The darker the phase, the more butadiene is present in the phase.

Determination of the Coefficient of Friction (COF)

The tough SBC block copolymers A2-1, A2-3 and A2-4 were separately blended with 10, 20, 30 and 40 wt.-% of the stiff SBC block copolymer A1 on a counter-rotating twin-screw extruder at from 200° C. to 220° C. and extruded to films of 50±20 μm thickness.

Next, the coefficient of friction (COF) of the films was determined by using standard ISO 8295 in which a 200 g part is wrapped with the film and pulled by a force measurement machine over a surface covered with the same type of film in a horizontal direction at a speed of 100 mm/min. The frictional force needed to pull this part forward is measured and summarized in Table 6 below. The static COF (= at the start) and dynamic COF (=once in motion) are measured. The topside of the film is pulled over the backside of the film ($COF_{IN-OUT}$), as this method simulates the unwinding force from a roll. Indeed, during winding of a roll at production, the backside is rolled on the topside of previous layer. An average value of 5 repetitions was calculated as final value. The lower the COF, the lower the stickiness.

TABLE 6

Coefficient of friction of tested Films

| $COF_{IN-OUT}$ | Static COF | Dynamic COF |
|---|---|---|
| 90% A2-4-10% A1 | 0.72 | 0.66 |
| 80% A2-4-20% A1 | 0.64 | 0.58 |
| 70% A2-4-30% A1 | 0.30 | 0.32 |
| 60% A2-4-40% A1 | 0.48 | 0.49 |
| 90% A2-3-10% A1 | 0.16 | 0.22 |
| 80% A2-3-20% A1 | 0.23 | 0.24 |
| 70% A2-3-30% A1 | 0.17 | 0.16 |
| 60% A2-3-40% A1 | 0.17 | 0.15 |
| 90% A2-1-10% A1 | 0.31 | 0.29 |
| 80% A2-1-20% A1 | 0.23 | 0.24 |
| 70% A2-1-30% A1 | 0.14 | 0.17 |
| 60% A2-1-40% A1 | 0.22 | 0.25 |

The test results show that the copolymer blends according to the invention (A2-1/A1 and A2-3/A1) have a significantly lower stickiness in comparison to blends comprising a block copolymer (A2-4) according to the state of the art.

The invention claimed is:

1. A polymer composition comprising components (a), (b), and (c):
   a) 45 to 100 wt.-% of component a) consisting of:
      a1) 20 to 80 wt.-% of at least one star-shaped block copolymer A1 having:
         two short branches consisting of a single copolymer block $(B/S)_{Ai}$ made from 65 to 95 wt.-% vinylaromatic monomers and 35 to 5 wt.-% dienes and having a glass transition temperature $Tg_A$ in the range from 40 to 90° C., and two long branches of the structure $S_t$—$[(B/S)_A]_n$-$(B/S)_{Ai}$ or $[(B/S)_A]_n$-$(B/S)_{Ai}$, linked (to one another via a coupling agent) by way of the inner blocks $(B/S)_{Ai}$, where the block $S_t$ is made from 95 to 100 wt.-% of vinylaromatic monomers and 0 to 5 wt.-% of dienes; the block $[(B/S)_A]_n$, consists of one or more different or identical copolymer blocks $(B/S)_A$, each made from 65 to 95 wt.-% vinylaromatic monomers and 35 to 5 wt.-% dienes and have a glass transition temperature $Tg_A$ in the range from 40 to 90° C.; n is a regular number of at least 1, and the block $(B/S)_{Ai}$ is as defined above, wherein the block $(B/S)_{Ai}$ has a number average molar mass $M_n$ in the range of from 5000 to 15000 g/mol and the entire block $[(B/S)_A]_n$ has a number average molar mass $M_n$ of 50000 to 150000 g/mol; and a2) 80 to 20 wt.-% of at least one star-shaped block copolymer A2, which has in essence two short branches of structure $S_e$—$(B/S)_B$ and two long branches of structure $(B/S)_{Ae}$—$S_i$—$(B/S)_B$, linked (to one another via a coupling agent) by way of the blocks $(B/S)_B$, wherein the polymer blocks $S_e$ and $S_i$ are identical; the polymer blocks $S_e$ and $S_i$ are made from 95 to 100 wt.-% of vinylaromatic monomers and of from 0 to 5 wt.-% of dienes; the copolymer block $(B/S)_{Ae}$ is made from 65 to 95 wt.-% vinylaromatic monomers and 35 to 5 wt.-% dienes and has a glass transition temperature $Tg_A$ in the range from 40 to 90° C.; and the homo- or copolymer blocks $(B/S)_B$ are each made from 0 to 25 wt.-%, vinylaromatic monomers, and 100 to 75 wt.-%, dienes and have a glass transition temperature $Tg_B$ in the range from −90° to −60° C.;

b) 0 to 55 wt.-% of at least one further thermoplastic polymer TP other than block copolymers A1 and A2; and c) 0 to 5 wt.-% of at least one additive or processing aid;

where the total amount of components (a) and, if present, (b) and/or (c) is 100% by weight, based on the entire polymer composition, and the glass transition temperature Tg is determined by DSC based on DIN EN ISO 11357-2:2014-07.

2. The polymer composition according to claim 1, wherein component a) consists of a1) 25 to 50 wt.-%, block copolymer A1 and a2) 50 to 75 wt.-%, block copolymer A2.

3. The polymer composition according to claim 1, wherein block copolymer A2 has a melt mass flow index (measured on a polymer melt at 220° C. and 5 kg load according to ISO 1133-1:2011) in the range of from 8 to 15 ml/10 min.

4. The polymer composition according to claim 1, wherein the proportion of the entirety of all of the blocks $(B/S)_B$ (=soft phase) of block copolymer A2 is from 30 to 37 wt.-%.

5. The polymer composition according to claim 1, wherein the block $(B/S)_B$ of block copolymer A2 is a copolymer block made from 1 to 25 wt.-%, vinylaromatic monomers and 99 to 75 wt.-% dienes.

6. The polymer composition according to claim 1, wherein in block copolymer A2 the number average molar mass Mn of the block $(B/S)_B$ is 5000 to 50000 g/mol; Mn of the block $(B/S)_{Ae}$ is 30000 to 100000 g/mol; and Mn of the polymer blocks $S_e$ or $S_i$ is in the range from 5000 to 30000 g/mol.

7. The polymer composition according to claim 1, wherein star shaped block copolymer A2 has the following structure:

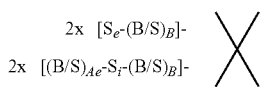

2x $[S_e$-$(B/S)_B]$-
2x $[(B/S)_{Ae}$-$S_i$-$(B/S)_B]$- where $S_e$, $S_i$, $(B/S)_{Ae}$ and $(B/S)_B$ are as defined above and X is a coupling center, which is formed by reaction of the living anionic polymer chain ends with a polyfunctional coupling agent.

8. The polymer composition according to claim 1, wherein the copolymer blocks $(B/S)_A$, $(B/S)_{Ai}$, $(B/S)_{Ae}$ and $(B/S)_B$ of block copolymers A1 and A2 are composed of polymerized vinylaromatic monomers and of dienes with random distribution.

9. The polymer composition according to claim 1, wherein the number-average molar mass Mn of the block $S_t$ of block copolymer A1 is in the range from 3000 to 8000 g/mol.

10. The polymer composition according to claim 1, wherein the block $[(B/S)_A]_n$ of block copolymer A1 consists of 2 to 10 different copolymer blocks $(B/S)_A$, where the blocks $(B/S)_A$ differ in their molar masses and/or in their vinylaromatic/diene ratio.

11. The polymer composition according to claim 1, wherein the copolymer blocks $(B/S)_A$, and/or $(B/S)_{Ai}$ of block copolymer A1 are made from 85 to 93 wt.-% of a vinylaromatic monomer and from 7 to 15 wt.-% of a diene.

12. The polymer composition according to claim 1, wherein star shaped block copolymer A1 has the following structure:

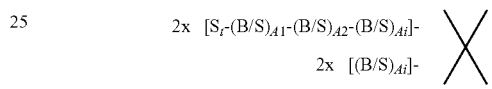

2x $[S_t$-$(B/S)_{A1}$-$(B/S)_{A2}$-$(B/S)_{Ai}]$-
2x $[(B/S)_{Ai}]$- where $S_t$, and $(B/S)_{Ai}$ are as defined in claim 1, $(B/S)_{A1}$ and $(B/S)_{A2}$ are two different copolymer blocks $(B/S)_A$ as defined in claim 1, and X is a coupling center, which is formed by reaction of the living anionic polymer chain with a polyfunctional coupling agent.

13. A process for the preparation of the polymer composition according to claim 1, comprising the step of melt mixing of component a) and optional components b) and/or c) by aid of a mixing apparatus at a temperature in the range of from 160° C. to 300° C.

14. A method of using the polymer composition according to claim 1 for the production of films.

15. Shrink film, produced from the polymer composition according to claim 1.

16. Star-shaped block copolymer A2 according to claim 1, wherein the star shaped block copolymer A2 has the following structure:

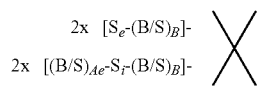

2x $[S_e$-$(B/S)_B]$-
2x $[(B/S)_{Ae}$-$S_i$-$(B/S)_B]$- where $S_e$, $S_i$, $(B/S)_{Ae}$ and $(B/S)_B$ are as defined in claim 1 and X is a coupling center, which is formed by reaction of the living anionic polymer chain ends with a polyfunctional coupling agent, and the proportion of the entirety of all of the blocks $(B/S)_B$ (=soft phase) of block copolymer A2 is from 31 to 35 wt.-%.

17. A process for the preparation of block copolymer A2 according to claim 16 characterized by:

a) a double initiation, b) a coupling step after the addition and polymerization of a diene and optionally a vinylaromatic monomer used for the preparation of homo- or copolymer block $(B/S)_B$, and c) the second initiation process placed before the addition and polymerization of the vinylaromatic monomer used for the preparation blocks $S_i$ and $S_e$, wherein the molar ratio of the first and the second initiation is from 0.9:1 to 1.5:1.

* * * * *